Nov. 18, 1969 G. SCHRADER 3,478,650
PISTON-CYLINDER ASSEMBLY WITH DUSTCAP
Filed May 13, 1968 2 Sheets-Sheet 2

GERT SCHRADER
INVENTOR.

BY
*Karl J. Ross*
ATTORNEY

# United States Patent Office 3,478,650
Patented Nov. 18, 1969

3,478,650
PISTON-CYLINDER ASSEMBLY WITH DUSTCAP
Gert Schrader, Walldorf, Hesse, Germany, assignor to Alfred Teves GmbH, Frankfurt am Main, Germany, a corporation of Germany
Filed May 13, 1968, Ser. No. 728,625
Claims priority, application Germany, May 13, 1967, T 33,867
Int. Cl. F16j 15/18, 15/50; B60t 11/10
U.S. Cl. 92—168
4 Claims

ABSTRACT OF THE DISCLOSURE

In a piston-and-cylinder assembly for an automotive spot-type disk brake a recess is provided in the wall of the cylinder bore for the deposition of particles detached from the dustcap and the packing material, to prevent the agglomeration of such matter in the space between the piston and the cylinder wall where it is apt to interfere with trouble-free piston motion.

---

My present invention relates to piston-and-cylinder assemblies having dustcaps or other annular dirt-excluding shields and, more particularly, to the open-ended fluid cylinders of an automotive spot-type disk-brake system provided with protective closures of the aforementioned kind.

Dustcaps or similar protective devices are designed to prevent the intrusion of foreign material into the interior of open-ended cylinders of wheel brakes which are particularly exposed to such matter under normal operating conditions. The caps form anticontamination shields to close the space between a piston or another relatively movable cylinder member and the wall of the cylinder receiving same. They must be strong as well as flexible, and impermeable to organic and inorganic liquids and solids. Moreover, they must maintain their properties under extreme temperature fluctuations. The conventional dustcap is an annular cap made of an elastomer (e.g. oil-resistant rubber) and mounted so that its inner peripheral and uncrimped flange hugs the piston or its rod while the peripheral flange of the outer rim is received in an annular recess in the cylinder housing about the mouth of the cylinder bore. While this method of attachment makes it possible to remove the dustcaps for inspection and/or repair of worn cylinder components, it exposes the caps to mechanical stress due to mounting and dismounting of the assembly, and eventually leads to the loss of their elasticity and the deterioration of the flexible material from repeated flexure. Another source of wear and tear is the considerable frictional stress produced by the reciprocating motion of the piston. The cumulative effect of these forces results in the detachment of small rubbery particles from the cap facing the cylinder bore, and their deposition therein together with particles which from time to time come off the sealing gasket or ring lodged in the cylinder wall. With the brake fluid or oil, these particles tend to form a viscous mass in the space between the piston and the cylinder wall, causing the piston to "stick," notwithstanding the presence of lubricants, and the braking action of the vehicle may be severely curtailed or even rendered ineffectual.

It is, therefore, the principal object of my invention to obviate the drawbacks of conventional dustcaps and to provide for trouble-free and long-lasting operation of the mechanism actuating spot-type disk brakes.

Another object is to achieve this end without extensive and costly changes in the structure and attachment of conventional dustcaps.

These objects and others which will become apparent hereinafter are attained, in accordance with the present invention, through a means in the interior of the cylinder whereby the debris shed by the dustcap and the sealing gasket is collected and rendered harmless from interference with the smooth operation of the system. Specifically, my invention provides for an annular recess formed in the cylinder wall, between the end or mouth of the cylinder and the groove receiving the annular sealing gasket.

The above and other objects, features and advantages of my invention will become more readily apparent from the following description, reference being made to the accompanying drawing in which.

Figure 1:
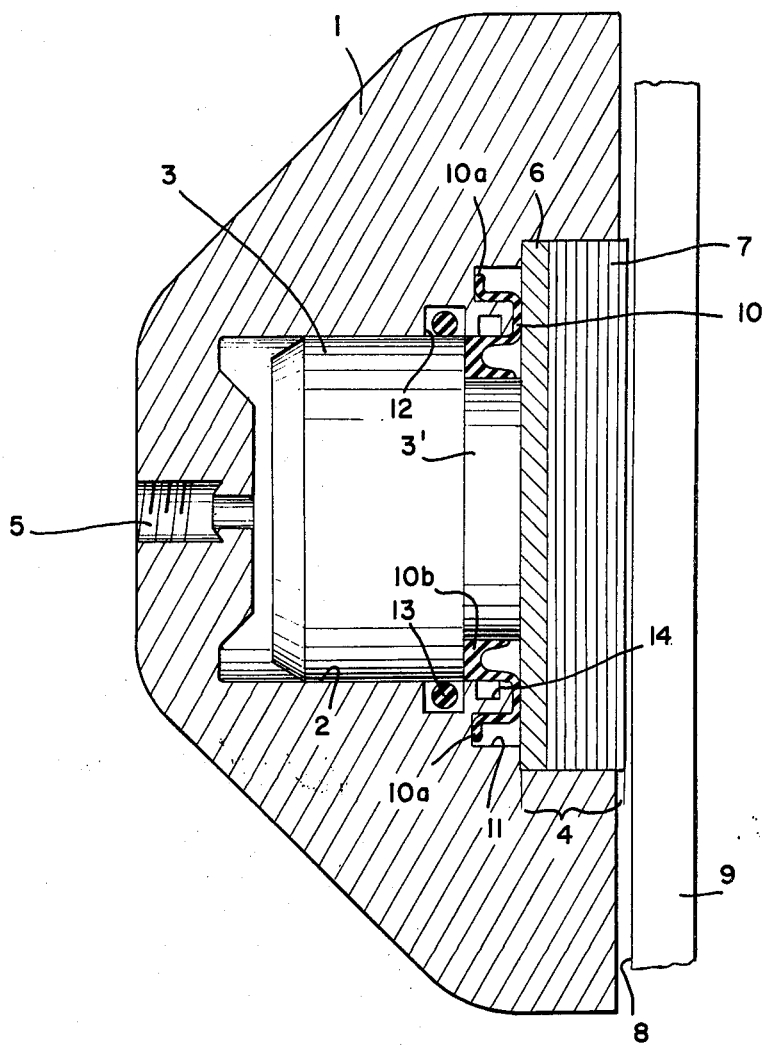
FIG. 1 is an axial cross-sectional view of a system employing the invention.
Figure 2:
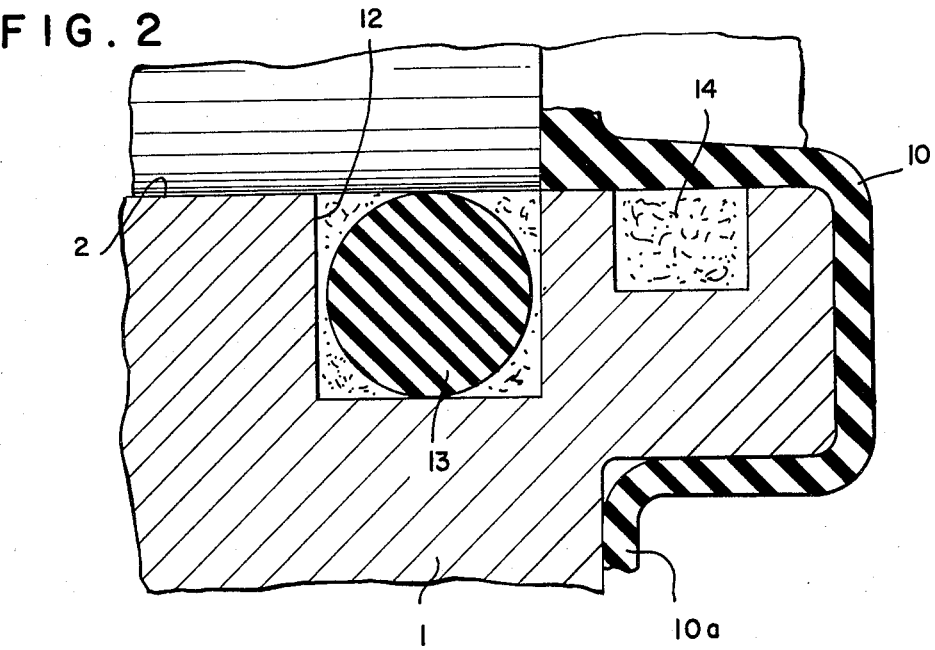
FIG. 2 is an enlarged cross-sectional view of the area marked II in FIG. 1.
Figure 3:
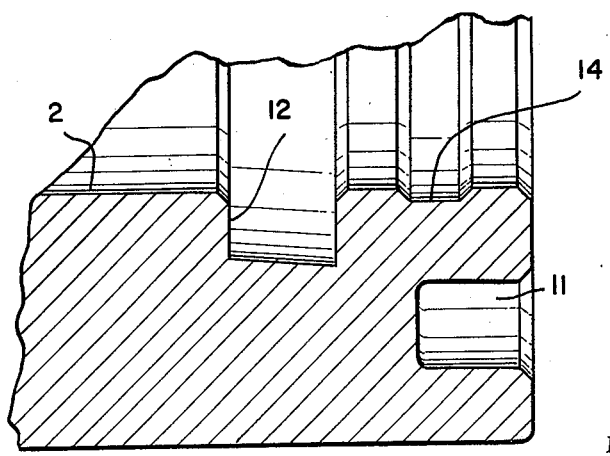
FIG. 3 is a view of the arrangement with dustcap, piston and seal removed.

In the drawing, I show an assembly comprising the cylinder housing 1 of a disk brake for an automotive vehicle with a cylinder 2 in which an axially slidable piston 3 urges a brakeshoe 4, under the pressure of hydraulic fluid delivered from a master cylinder (not shown) via the inlet port 5 against a brake disk 9. The brakeshoe 4, comprising the backing plate 6 to which the brake lining 7 is attached, bears against the braking face 8 of the brake disk 9.

The dustcap 10 received in a groove-like recess 11 in the wall of the cylinder 2 facing the brakeshoe 4, and its inner rim 10b hugging the forward small diameter step 3' of the piston 3, seals off the interior of the cylinder.

A packing or sealing ring 13, received in an annular groove 12 in the wall of the cylinder 2 and open toward the cylinder bore, forms a fluid-tight seal with the piston. According to this invention, a recess 14 is provided in the wall of the cylinder bore, between the groove 12 and the open end of the cylinder, to collect particles abraded from the dustcap and the packing ring as the result of normal operating conditions of the brake mechanism.

The back-and-forth motion of the piston 3 alternately stretches and squeezes the dustcap 10 which is attached to the piston. The circumferential surface of the piston 3 also rubs against the exposed surface of the packing ring 13 in the course of the oscillations. Any particles loosened by these motions from the dustcap and/or packing material are swept along with the piston until they are accumulated in the recess 14 which represents a sink for such material. The arrival of additional debris compacts the earlier deposits in the recess, from which the entire accumulation can be removed periodically.

Thus, continuous removal of loose particles from the operating surfaces of a piston-and-cylinder assembly of the type described substantially contributes to the braking efficiency of an automotive vehicle.

The invention described and illustrated is believed to admit of many modifications within the ability of persons skilled in the art, all such modifications being considered within the spirit and scope of the appended claim.

I claim:
1. In a piston-and-cylinder arrangement for an automotive spot-type disk brake, comprising a cylinder housing having a cylinder open at one end and provided with an annular groove; a piston reciprocable in said cylinder; a sealing ring annularly received in said groove; and an elastomeric dustcap anchored at one extremity to said housing and at its other extremity to said piston and hermetically closing said open end of said cylinder, said dustcap being stretchable upon reciprocation of said piston and having an effective surface area normal to the direction of reciprocation of said piston relative to said housing, the improvement wherein said cylinder housing is formed with an annular recess in the wall of said cylinder between said open end and said groove for collecting contaminating particles.

2. The improvement defined in claim 1 wherein said dustcap hugs said piston in the region of said recess.

3. The improvement defined in claim 2 wherein said housing is provided with another annular groove, surrounding said open end and opening axially in the direction thereof, said dustcap having a peripheral rim received in said other groove.

4. The improvement defined in claim 1 wherein said recess is shallower than said groove.

References Cited

UNITED STATES PATENTS

| | | | |
|---|---|---|---|
| 2,282,312 | 5/1942 | Halstead | 92—168 |
| 3,188,098 | 6/1965 | Skinner | 277—205 |
| 3,195,360 | 7/1965 | Burnett | 74—18.2 |
| 3,346,075 | 10/1967 | Swift | 74—18 |
| 3,385,118 | 5/1968 | Mathews et al. | 74—18.2 |
| 3,421,604 | 1/1969 | Hobbs | 92—168 |
| 3,424,276 | 1/1969 | Robinette | 188—152 |
| 3,432,010 | 3/1969 | Hemus | 92—168 |

MARTIN P. SCHWADRON, Primary Examiner

LESLIE J. PAYNE, Assistant Examiner

U.S. Cl. X.R.

74—18, 18.2; 188—100, 152